United States Patent [19]

Ueno

[11] Patent Number: 4,727,429
[45] Date of Patent: Feb. 23, 1988

[54] FACSIMILE COMMUNICATION METHOD AND APPARATUS FOR TRANSMITTING A PREDETERMINED PORTION OF MESSAGE DATA AS A TRAINING CHECK SIGNAL

[75] Inventor: Seizo Ueno, Tokyo, Japan

[73] Assignee: Kabushiki Kaisha Toshiba, Japan

[21] Appl. No.: 885,446

[22] Filed: Jul. 14, 1986

[30] Foreign Application Priority Data

Sep. 17, 1985 [JP] Japan ................................ 60-204621

[51] Int. Cl.$^4$ ............................................... H04N 1/32
[52] U.S. Cl. .................................... 358/256; 358/260; 358/286
[58] Field of Search ............... 358/256, 257, 260, 286; 375/13, 121; 178/4.1 C

[56] References Cited

U.S. PATENT DOCUMENTS

| | | | |
|---|---|---|---|
| 4,153,916 | 5/1979 | Miwa | 358/257 |
| 4,274,114 | 6/1981 | Kozima | 358/257 |
| 4,586,086 | 4/1986 | Ohzeki | 358/257 |
| 4,630,126 | 12/1986 | Kaku | 358/257 |

Primary Examiner—Michael A. Masinick
Attorney, Agent, or Firm—Banner, Birch, McKie & Beckett

[57] ABSTRACT

A facsimile communication method wherein a facsimile transmitter transmits a portion of the message data to a facsimile receiver as the training check signal. A modem in the receiver trains automatically by its equalization function. The training is verified by ensuring that a predetermined number of bits per line have been transmitted and received. In case of success in training, the rest of message data is then transmitted.

22 Claims, 9 Drawing Figures

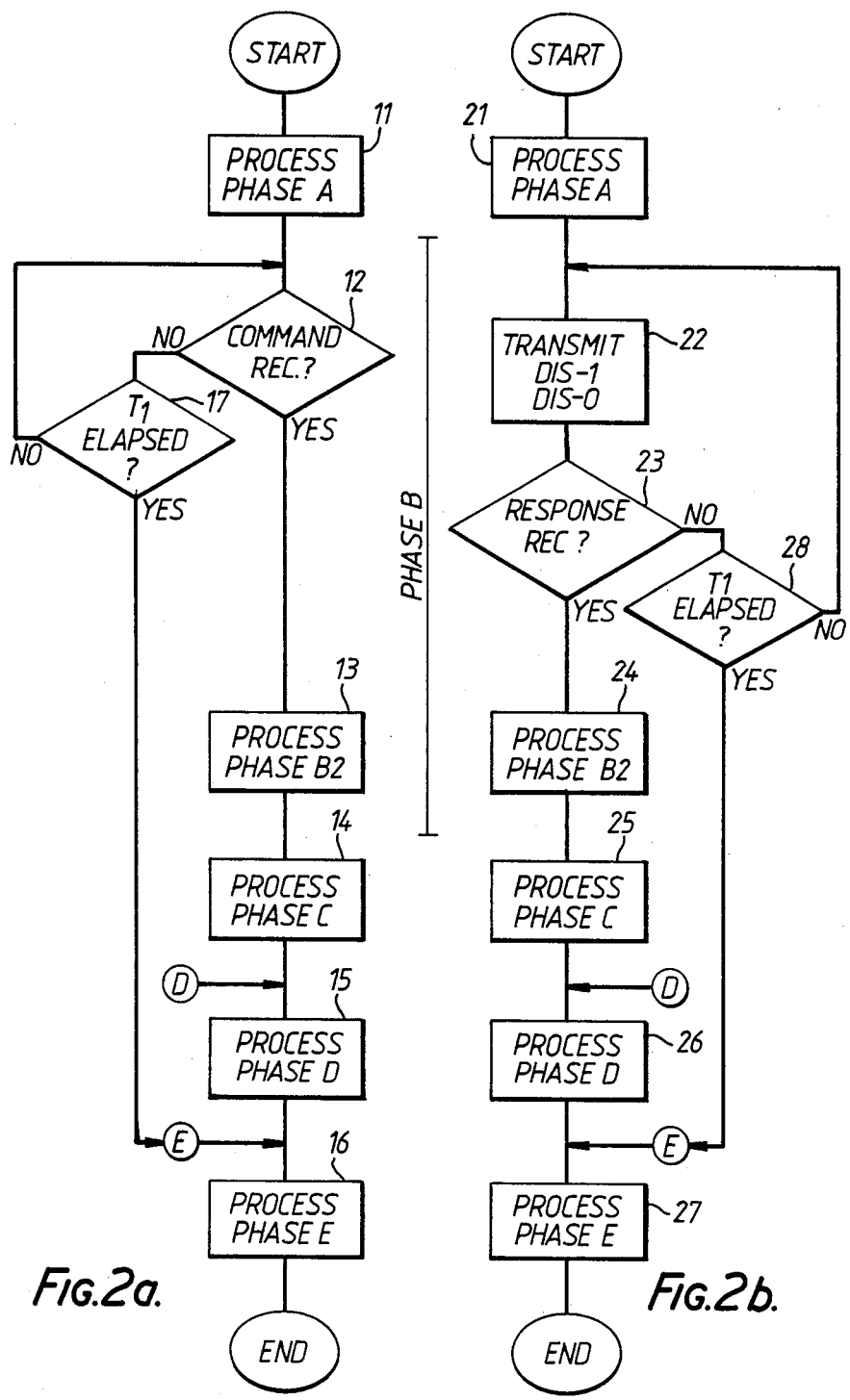

FACSIMILE COMMUNICATION METHOD AND APPARATUS FOR TRANSMITTING A PREDETERMINED PORTION OF MESSAGE DATA AS A TRAINING CHECK SIGNAL

BACKGROUND OF THE INVENTION

This invention is directed to a field of facsimile communication and, more particularly, is directed to an improved facsimile communication method, system and apparatus.

Over the past decade facsimile apparatus has become one of the most popular facilities in an office. It is convenient to transmit document information over a general switched telephone network. Such transmission of documents is possible with facsimile apparatus, even if the documents contain graphic information. However, to obtain maximum benefit from facsimile communication it is necessary for many models of facsimile machines, even those made by different manufactures, to be able to communicate with one another.

In an effort to provide uniformity in the operation of different facsimile machines from various manufacturers, the International Telegraph and Telephone Consultative Committee (CCITT) of the International Telecommunication Union (ITU) has provided recommended procedures of operation for facsimile communication. These recommendations are found in the aforementioned Committee's publication "Data Communication Over The Telephone Network", Volume VIII—Fascicle VIII. 1, published in Geneva (1985) (hereinafter "CCITT Standards"). Operation in accordance with the recommendations provided in the CCITT Standards allows mutual facsimile communication, even if the communicating machines are made by different manufacturers. This ability of mutual communication between machines of different manufacturers is one of the main reasons why facsimile communication has become so popular.

Notwithstanding the ability of various models to communicate with one another, it is always desirable to provide compatible facsimile apparatus which can transmit more rapidly with better quality. Accordingly, the recommendations of the CCITT Standards do not prohibit facsimile machines from providing optional functions. Therefore, there are many facsimile machines which provide one or more optional functions with regard to, e.g., the encoding method, resolution, procedure, etc. In accordance with the CCITT standards, compatible facsimile machines can be used for specific communication when each are provided with the same optional functions. Additionally, they can be used for basic facsimile communication with any other apparatus in accordance with the standards of the CCITT Standards.

According to Recommendation T.30 (as referenced in the abovenoted CCITT Standards) a facsimile call should be completed through five phases, i.e., "Call Establishment" (Phase A), "Pre-Message Procedure" (Phase B), "In-Message Procedure and Message Transmission" (Phase $C_1$ and $C_2$), "Post-Message Procedure" (Phase D) and "Call Release" (Phase E). In the initial steps of Phase B, two facsimile machines operating in accordance with the CCITT standards determine whether they are both adapted to implement similar optional features. If so, the remaining phases of communication can be completed in accordance with the particular protocol of those optional features. It is noted that while an optional feature may affect a particular protocol of a portion of communication, the remaining portions would be completed in accordance with the recommendations of the CCITT Standards.

In the last steps of Phase B, the two facsimile machines communicate to synchronize their operation and to compensate for particular line impedences, interference, etc. To do this, phasing, training and training check (TCF) signals are transmitted from the transmitter to the receiver. The phasing and training signals are used for the purpose of establishment of synchronization and automatic equalization of the modem within the receiver. In order to perform this modem training, the phasing and training signals must have a predetermined pattern and length. Therefore, the pattern and length of these signals is specified in Recommendation V.27 ter or V.29 as referenced in the above CCITT Standards.

The training check (TCF) signal, used for verification of modem training, also has a specified pattern and length, Recommendation T.30. Particularly, the TCF signal is specified to be a series of logical zeros ("0") lasting for 1.5 seconds with acceptable error range of 10 per cent. However, this signal comprises a major portion of the transmit time required for a document. As an example, the transmit time of the data necessary to transmit every line of a document, e.g., end of line (EOL) signals, message signals, fill time, etc. (referred to herein as total coded data), depends on the contents of the document to be transmitted, as will be described below. Let us assume that a document can be transmitted within 25 seconds. Comparing this time of 25 seconds to the 1.5 second transmit time of the training check signal, it is obvious that the overall transmit time of a facsimile machine can be decreased markedly if the time to transmit the TCF signal can be reduced or eliminated.

SUMMARY OF THE INVENTION

It is, therefore, an object of the present invention to provide a new facsimile communication method and apparatus capable of decreasing the overall transmit time of a document.

It is another object of the present invention to provide facsimile apparatus with capability of high speed transmission while verifying modem training.

It is a further object of the present invention to provide method and apparatus for decreasing the time necessary for pre-message procedure in facsimile communication.

The present invention realizes the above noted objects by providing a facsimile communication system including a facsimile transmitter and receiver wherein the time required to verify modem training is minimized. In accordance with the present invention, after the communication link has been established and training of the modem completed, the facsimile transmitter transmits a portion of the message data as the training check (TCF) signal for verfication of modem training. If the result of the training check is OK, the facsimile receiver responds with transmission of the confirmation to receive (CFR) signal and the transmitter transmits the rest of the message data. The portion of the message data to be transmitted as the TCF signal is a series of coded lines of data. Each scanned line of data is encoded by a predetermined encoding method. Therefore, the receiver is able to verify the modem training by decoding the received, coded data signals and determining whether the proper number of bits per line have been received. The data used as the TCF signal is of course printed as a portion of the document. Thus, according to the invention the transmit time for the training check signal is eliminated and the total transmit time can be reduced markedly.

BRIEF DESCRIPTION OF THE DRAWINGS

FIGS. 2a and 2b show general flow diagrams to be executed by the transmitter and receiver (shown in FIG. 1), respectively.

DETAILED DESCRIPTION OF THE PREFERRED EMBODIMENTS

Figure 1:
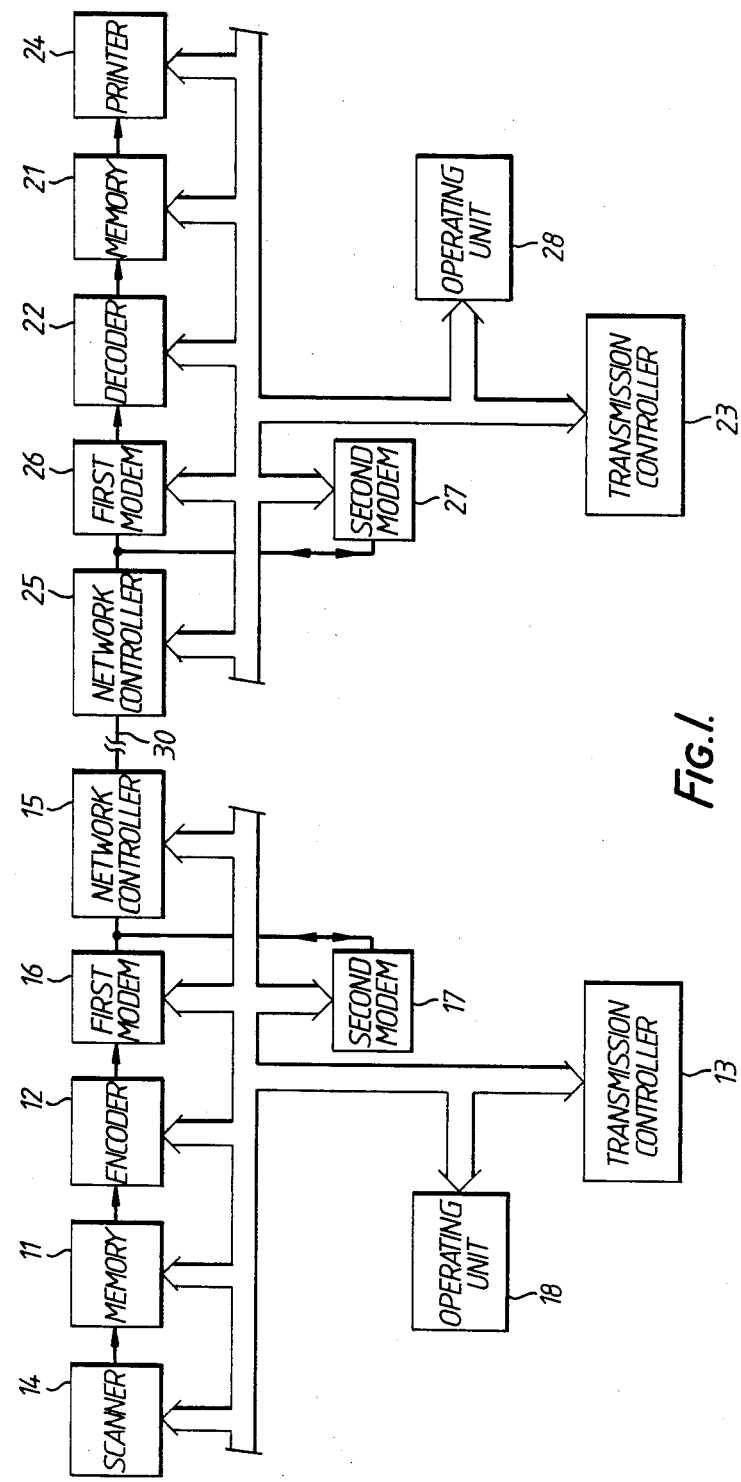
FIG. 1 shows an embodiment of the present invention in block diagram form.

A facsimile transmitter is shown on the left in FIG. (1) and basically includes memory (11), encoder (12), transmission controller (13), scanner (14), network controller (15), first modem (16), second modem (17) and operating unit (18). A facsimile receiver is shown on the right in FIG. 1 and includes memory (21), decoder (22), transmission controller (23), printer (24), network controller (25), first modem (26), second modem (27) and operating unit (28). The transmitter and receiver are in data communication via a public telephone line (30).

The transmitter and the receiver might be regarded as the transmitting portion and receiving portion of a facsimile transceiver. It is noted that should the transmitter and receiver of FIG. 1 be combined to provide a transceiver, then most of the units shown as individual elements of each, e.g., the memory, the transmission controller, the network controller, and the first and second modem, would be adapted for performing both transmission and reception.

Scanner (14) is a unit for optically reading the characters and figures on the document to be transmitted (not shown) with a predetermined horizontal and vertical resolution, as is known in the art. Scanner (14) includes a scanning mechanism composed of feed rollers, a driving motor and other associated units.

The scanning operation, including the feeding operation, is controlled by transmission controller (13). The lines of data read by scanner (14) are stored in memory (11) under the control of transmission controller (13). Memory (11) is provided for storing the data to be transmitted as the training check (TCF) signal. Therefore, memory (11) has enough capacity to store data bits corresponding to N lines of data, wherein N is the number of lines transmitted for verification of modem training. Typically, N is chosen such that the total time required to send the portion of message data corresponds to the specified duration of the TCF signal. As an example, assume that the specified duration of the TCF signal is 1.5 seconds. Assume further that the minimum transmit time of a total coded scan line is 20 milliseconds. Then N would be chosen to be about 75 lines. In addition to storing the document data for the TCF signal, memory (11) also serves as a buffer between scanner (14) and encoder (12) for the remaining data.

Encoder (12) encodes the message data to suppress its redundancy. Encoder (12) may be adapted to encode in accordance with any method known in the art. Particularly, encoder (12) may be adapted to encode the message data in accordance with the encoding chart of Recommendation T.4 of the foregoing CCITT Standards. Other methods and apparatus for suppressing redundancy work equally as well with the present invention and may be used.

First Modem (16) is provided for modulating the encoded data signal and, if necessary, providing the function of fallback, i.e., during training first modem (16) first attempts to transmit at the highest possible speed and falls back until synchronism with the receiver is achieved. First modem (16) operates under the control of transmission controller (13) and according to Recommendation V.29 and V.27 ter of the CCITT Standards.

Second modem (17) is provided for transmission and reception of procedural data, i.e., data for facsimile operational procedure, which transmission is bi-directional. The procedural data to be transmitted is prepared by transmission controller (13) and the received procedural data is transferred to transmission controller (13).

Network controller (15) is provided for connecting and disconnecting the transmitter to and from communication line (30) under the control of transmission controller (13). Transmission controller (13) controls every unit, as described above, in order to execute the facsimile communication procedure. Transmission controller (13) includes a microprocessor and a memory (not shown) for storing data (program and variable) necessary to execute the methods illustrated in FIGS. (2a) and (3a).

Operating unit (18) is provided for interfacing the transmitter with a user such that the user can select such communication parameters as: the called party, resolution, start of transmission, etc. The data thus provided is utilized by transmission controller (13) to control the transmission of the document accordingly.

Network controller (25), first modem (26) and second modem (27) provide functions for the receiver which correspond to the function which is provided by the respective transmitter element. First modem (26) receives the modulated signal and demodulates it. This modem provides the function of automatic equalization as well as fallback. Automatic equalization is a function similar to automatic gain control especially designed to compensate the received signal for amplitude and delay characteristic distortions of a particular line, as is known in the art.

Decoder (22) decodes the data received and demodulated by first modem (26). The decode function is the inverse of that provided by encoder (12). Further, decoder (22) counts the number of decoded data bits in each line to determine whether errors in transmission have occurred. The number of data bits in each line is determined by the transmitter and receiver during the initial stages of phase B as will be described below. This number remains constant throughout the transmission. If the number of counted bits is equal to the number of data bits in each line, then it can be assumed that no transmission errors have occurred. Conversely, if the transmitted number does not equal the counted number, then it can be assumed that some transmission errors must have occurred. Data representing the transmission integrity, i.e., the occurrence of error, is provided to transmission controller (23) from decoder (22).

With respect to the remaining elements of the receiver, memory (21) serves as a buffer for data to be printed. Printer (24) prints the data successively supplied from memory (21) under the control of transmission controller (23). Transmission controller (23) corresponds to that of the transmitter, and controls every unit, as described above, in order to execute the facsimile communication procedure. Data necessary to execute the methods illustrated in FIGS. (2b) and (3b) are stored within transmission controller (23). Operating unit (28) provides the same function as the corresponding unit in the transmitter. Hence, data to set the receiver in either the automatic receiving mode or manually operated mode is provided through operating unit (28). In this embodiment, it is assumed that the receiver is set up in the automatic receiving mode.

The operation of the subject invention will be described by reference to FIGS. 2a and 2b which provide general flow diagrams of methods to be executed by transmission controller (13) and (23), respectively. Further, FIGS. (2a) and (2b) are illustrations of the method in accordance with the CCITT Standards, even though illustrated with some degree of abbreviation. Hence, the procedures of FIGS. 2(a) and (b) should be regarded as the same as those specified in Recommendation T.30, except the contents of a portion of Phase B which is the very body of the present invention. This portion of Phase B can be regarded as an optional function or procedure as mentioned in Recommendation T.30.

For the purpose of convenience, ordinary procedures specified in Recommendation T.30 will be described first. In Phase A, call establishment can be realized manually and/or automatically (this provides four combinations of operating methods). The method which is most popular among these combinations is that where the calling station is manually operated and the called station is automatically operated. In this case, after the call origination (pick up), an operator dials the desired number and operates operating unit (18) to cause the transmitter to be switched to telephone line 30. At this time, controller (13) sends dial signals according to the desired number provided by the user, step 11. In step 21, network controller (25) detects a ring and answers the call by connecting the receiver to telephone line (30) under control of transmission controller (23).

Next, in Phase B, pre-message procedure is performed. At the beginning of Phase B, digital identification signals (DIS signals) are transmitted from the receiver to the transmitter to identify the capabilities of the receiver. Several DIS signals may be transmitted in addition to the standard DIS-0 signal. If transmitted alone, the standard DIS-0 signal indicates operation in strict accordance with CCITT Standards, i.e., no optional functions. Transmission of a DIS-1 signal in addition to the DIS-0 signal is used to indicate that the receiver is capable of operating in accordance with the method of the present invention.

Transmission controller (13) waits to receive the DIS signal from the receiver (step 12) and, if received before a predetermined wait interval T elapses, then transmission controller (13) transmits a digital command signal (DCS) to indicate to the receiver which functions (standard and optional) they will use for communication. As an example, the DCS signal is used to determine how many data bits will be transmitted per scan line. Also, transmission controller (13) transmits the phasing/training and training check (TCF) signals sequentially (step 12). If the DIS signal is not received before the predetermined wait time T elapses, the transmitter will terminate communication by proceeding to the call release portion of the communication protocol (phase E, step 16).

In the receiver, controller (23) recognizes the reception of the DCS signal (YES at step 23), and then causes first modem (26) to receive and train, and causes second modem (27) to respond by transmitting the confirmation to receive (CFR) signal, indicating success in training (step 24). In the transmitter, controller (13) recognizes the response of the CFR signal at the final stage in step 13. Then both transmitter and receiver enter Phase C.

In Phase C the facsimile transmitter uses first modem (16) to transmit message data to the facsimile receiver, each exchanging the binary coded procedural data for line supervision and so forth.

In Phase D both transmitter and receiver make confirmations as to end of message or existence of another document, and finally make confirmation of the end of facsimile procedure.

In accordance with the present invention, the receiver transmits not only the standard DIS-0 signal but also the special digital identification signal DIS-1 in sequence such that the DIS-1 is transmitted before the DIS-0. The DIS-1 is recognized as an option compatible with Recommendation T.30 (DIS-1 indicates a nonstandard signal referred to in the CCITT Standard). In this embodiment, DIS-1 is composed of a plurality of identification bits which indicate not only the ability to perform standard functions but also the ability to perform the method of training check which is the subject of this invention. Other optional features may be identified in addition to those disclosed herein. However, the following discussion assumes only the optional training check feature is identified. The optional procedures for training check are processed in steps 12 and 23.

Figure 3A:
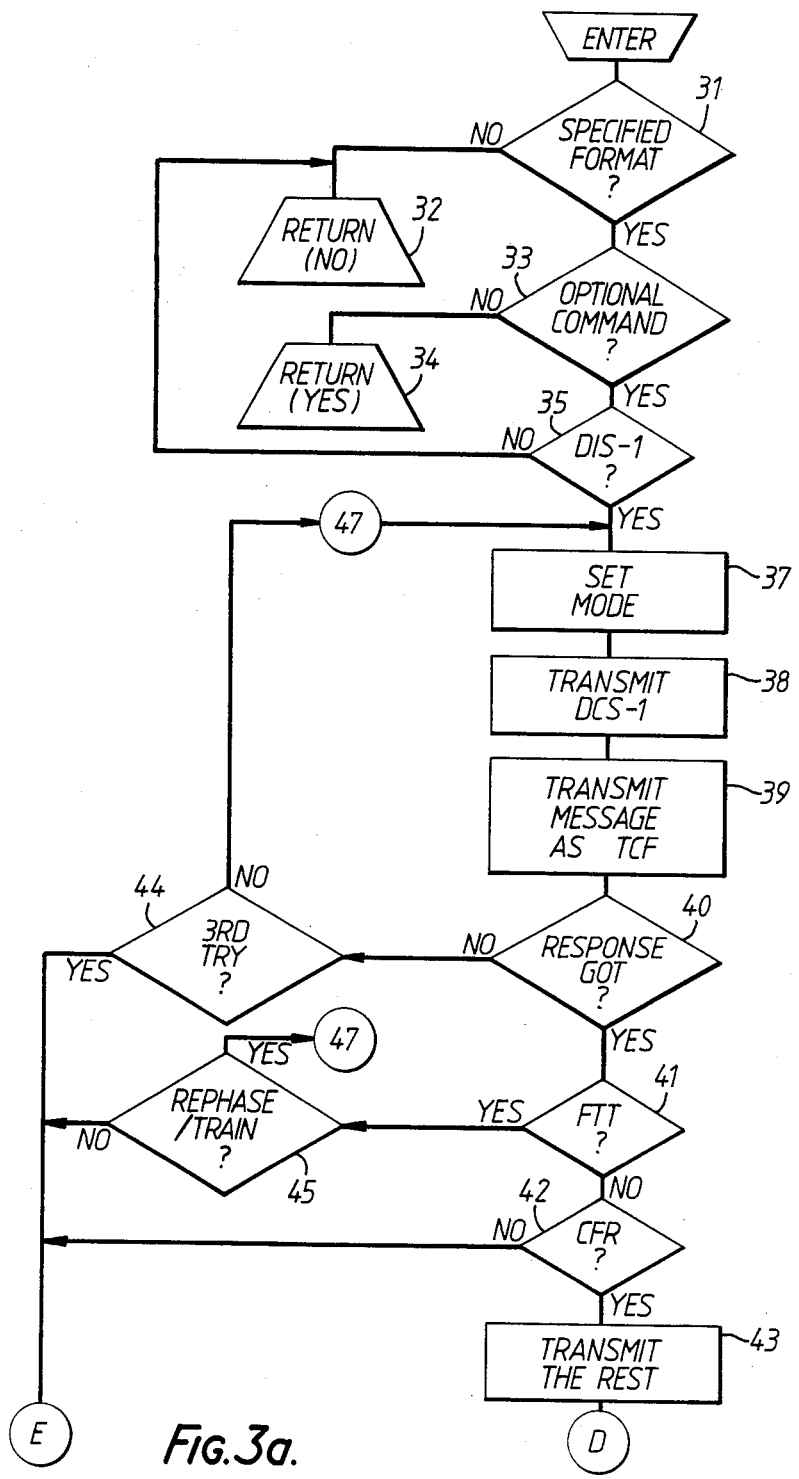
FIGS. 3a and 3b are more detailed decisional flow diagrams illustrating the methods of pre-message procedure (phase B) in accordance with the present invention.
Figure 3B:
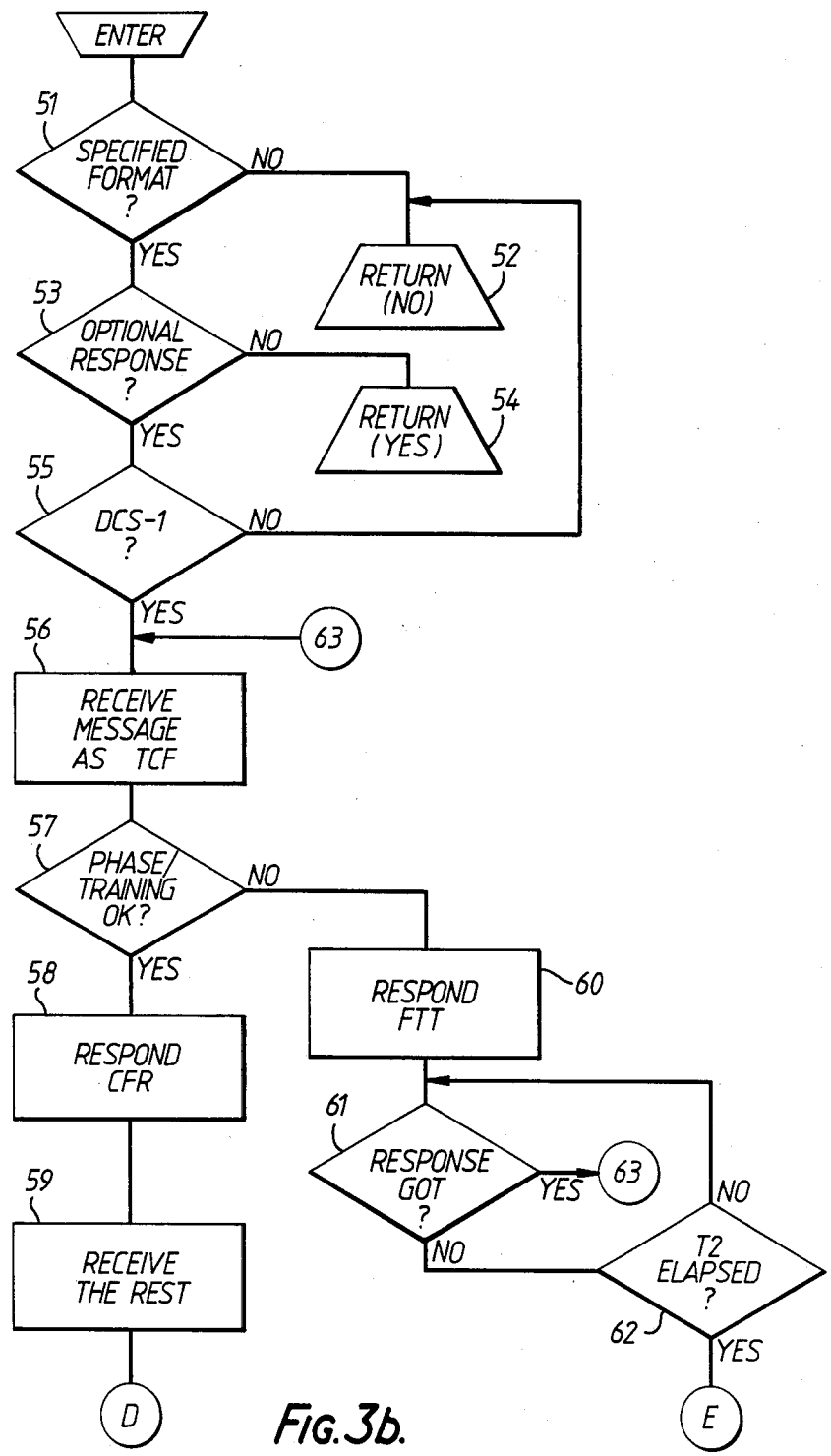
Figure 4:
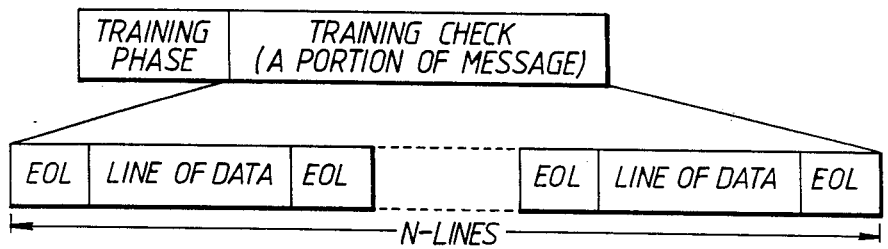
FIG. 4 is an illustration of the signal format to be used for transmission of the training check signal.
Figures 5A, 5B:
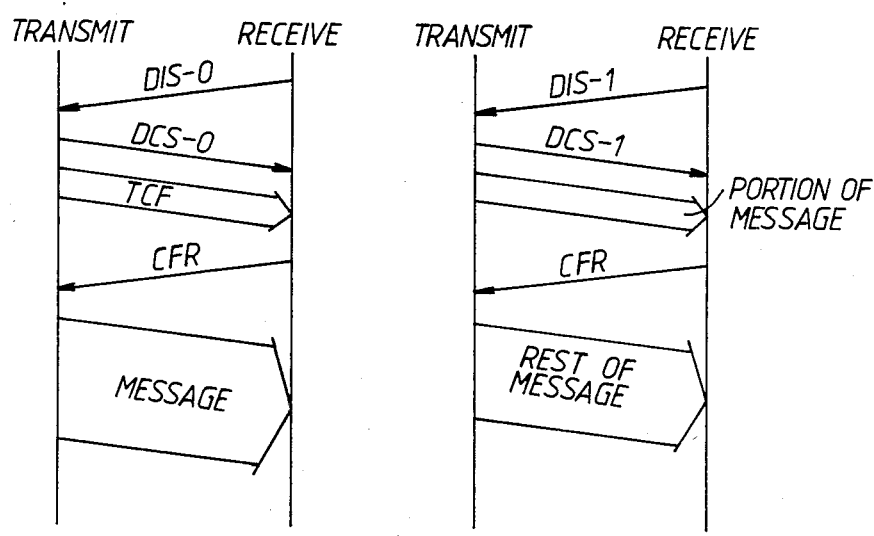
FIGS. 5a and 5b are diagrams of the transmission procedure illustrating standard mode transmission and special mode transmission, respectively.
Figure 6:
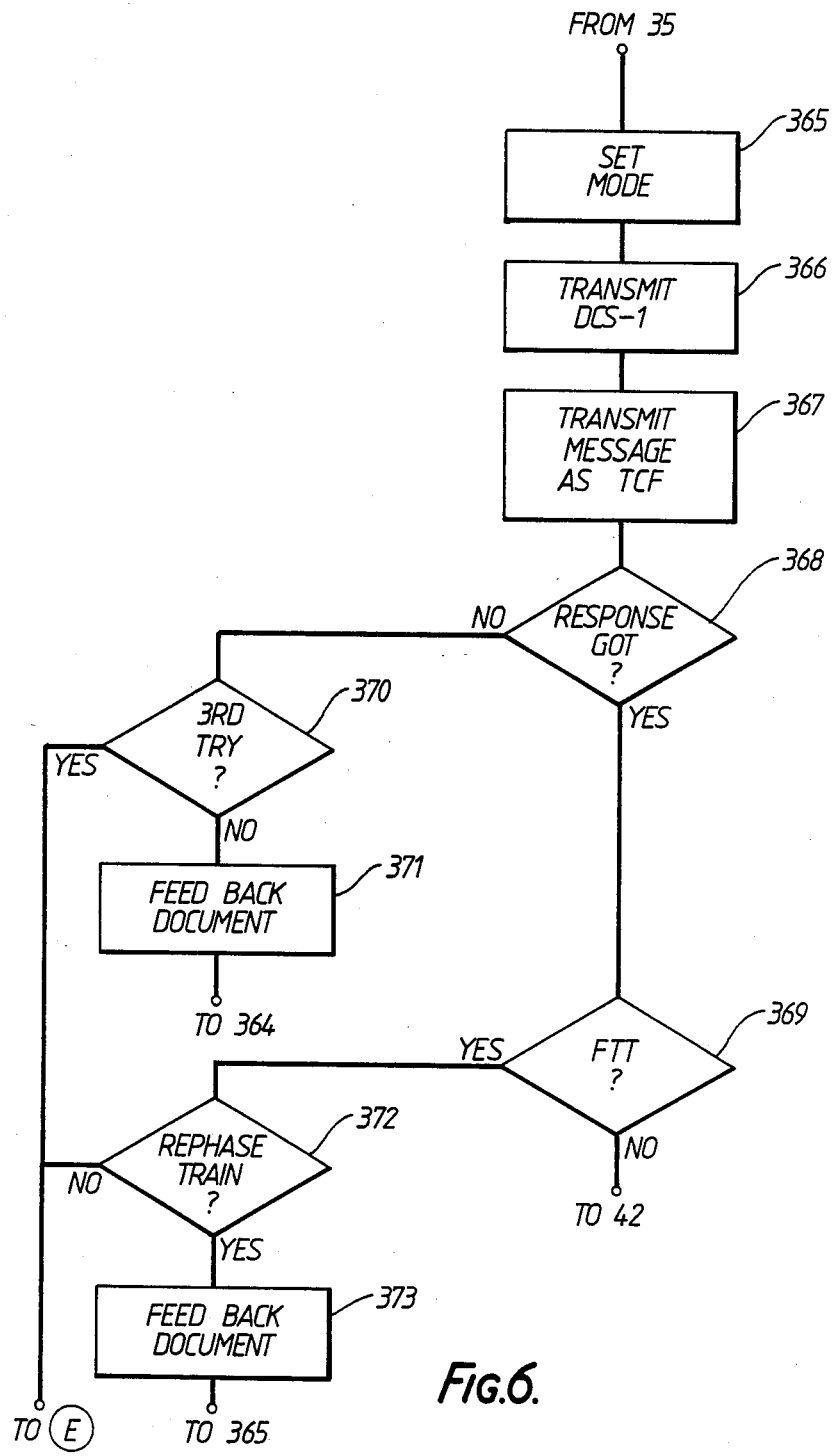
FIG. 6 is a decisional flow diagram of an alternative embodiment of the present invention.

FIG. 3a and 3b are abbreviated flow diagrams of the substeps which comprise steps 12 and 23, respectively. After the DIS-1 and DIS-0 signals have been received, controller (13) within the transmitter determines whether the received signal has the specified format (step 31). If the received signal has the specified format, controller (13) determines whether the received signal is an optional identification signal (step 33). If the result of step 33 is YES, controller (13) further determines whether the optional identification signal is the DIS-1 signal (step 35). If the received signal is either not of the specific format (step 31) or is not the DIS-1 optional command (step 35) then controller (13) considers the received signal erroneous and returns to wait to receive a response within the predetermined wait time $T_1$ (step 17). If the result of step 33 is NO, then the received command is the standard DIS-0 and the process returns to step 13 of FIG. 2a, resulting in ordinary procedure as described above.

In the case of YES at step 35, the transmission of a portion of the message as the TCF signal will be performed. First controller (13) enters the optional mode to transmit and receive in accordance with the method of the present invention and identified by the DIS-1 signal (step 37). Thereafter, controller (13) prepares a digital command signal DCS-1 (an option to the normal DCS-0 signal) (step 37) and transmits the DCS-1 signal to the receiver via modem (17) (step 38). As mentioned above, the DCS signal commands the receiver to operate in the mode chosen by the transmitter from the functions identified by the DIS-1 signal. In accordance with the present invention, the DCS-1 signal commands the receiver to operate in the mode wherein the training check signal comprises a portion of the document data.

After transmitting the DCS-1 signal, controller (13) controls scanner (14) to scan N lines of the document to be transmitted and memory (11) is controlled to store the scanned data (step 39). At the same time, controller (13) controls encoder 12 to encode the scanned data and controls first modem (16) to transmit the phasing/training signals and a portion of the encoded message data for the TCF signal (step 39), as discussed above. FIG. (4) is an illustration of the TCF signal format. As shown in FIG. (4), the portion of message to be transmitted is a series of coded lines of data which is configured in accordance with the specifications for message data contained in Recommendation T.4 of the CCITT Standards.

In the receiver, controller (23) receives the DCS-1 signal and determines whether the received signal has the specified format (step 51). If the result of step 51 is YES, controller (23) determines whether the received signal is the optional one (step 53). If so, controller (23) further determines whether the received signal is the DCS-1 signal (step 55), and normally the process goes toward step 56. If the received signal is not of the specified format (step 51), or if it is not the optional DCS-1 command (step 55), then controller (23) returns to step 28 (FIG. 2b) to continue transmitting the DIS signal until the designated wait time T1 elapses or a response is received. If the result of step 53 is NO, the received response is the standard DCS-0 signal. In this case, the process returns to step 24 resulting in the ordinary operational procedures.

At step 56, the phase/training signals and the portion of the message used for the TCF signal are received. The result of training is determined by first modem (26), as described hereinabove by reference to FIG. 1, and communicated to controller (23) (step 57). Controller (23) processes the following steps according to the result of step 57. If the training is O.K. (step 57), then controller (23) controls second modem (27) to respond by transmitting a confirmation to receive (CFR) signal (step 58). On the contrary, if the training has not succeeded, then a failure to train (FTT) signal is transmitted (step 60).

In the transmitter, if the CFR signal is detected, steps 40, 41 and 42, then controller (13) transmits the rest of the message (step 43), and returns to step 15 (FIG. 2a). However, if no response is received then controller (13) repeats steps 37, 38, 39, 40 and 44 a maximum of three times and, thereafter, gives up and returns to step 16 (FIG. 2a) to terminate the communication link. Similarly, if the received signal is the FTT signal, controller (13) repeats steps 37, 38, 39, 40, 41 and 45 as long as it can fallback, as decribed hereinabove by reference to first modem (16), FIG. 1. When contoller (13) repeats training, whether due to a failure to receive a response or to a failure to train, it uses the data stored in memory (11) for retransmission of the TCF signal. If controller (13) detects the CFR signal (step 42) then it will transmit the remainder of the message (step 43) and return to step 15 (FIG. 2a).

In the receiver, after transmitting the CFR signal, controller (23) receives the rest of the message, prints it (step 59), and then returns to step 26, FIG. 2b. On the contrary, in case of failure to train, the receiver trys again to receive and train (steps 56, 57, 60 and 61), until either training succeeds or the designated time out period T2 elapses (step 62).

With reference to figures (5a) and (5b), there is provided a diagram illustrating the methods of transmission, i.e., standard mode and special mode. The transmission time is reduced by a time period corresponding to that for the portion of message data which is transmitted as the TCF signal.

FIG. (6) is a decisional flow diagram of another embodiment of the present invention. In the flow diagram shown in FIG. 3a, steps 36 through 41 and steps 44 and 45 are replaced with steps 365 through 363 shown in FIG. (6). In this embodiment, the data to be transmitted is not stored. Instead, the document is fed back through scanner (14) (FIG. 1) in case of retraining (step 371 and 373). Therefore, the capacity of memory (11) can be reduced to that capacity necessary for buffering. Further, the present invention can be modified to allow memory (11) to store the encoded data used for the training check signal.

Although in the foregoing embodiments the transmitter and the receiver or transceiver is according to the "Recommendations" by CCITT, it is clearly understood that the invention is not restricted to those according to the "Recommendation". Moreover, even if the facilities are according to the "Recommendation", numerous change may be made without departing from the spirit and principles of the invention. Above all, as for data to be transmitted, the message is not restricted to document data, it might be character data or any other control data which can be used as not only a training check signal but also net message data.

We claim:

1. In a facsimile communication system having a transmitter and a receiver, a method for verification of training comprising the steps of:

forming, at said transmitter, a training check signal from a predetermined portion of message data to be transmitted;

transmitting the training check signal to said receiver;

verifying, at said receiver, successful training by receiving the training check signal and determining whether it is substantially the same as that transmitted;

transmitting, to said transmitter, a confirmation signal representing that the transmission of the rest of the message data may commence if the training is successful; and transmitting, to said receiver, the rest of the message data upon reception of the configuration signal.

2. The method according to claim 1 further comprising the steps of:

transmitting a control signal to said transmitter if the training is not successful; and retransmitting the training check signal to said receiver upon reception of the control signal.

3. The method according to claim 2 further comprising the step of:

storing the portion of message data used for the training check signal until reception of the confirmation signal.

4. The method according to claim 2 wherein said step of forming comprises the substep of encoding a portion of message data according to an encoding method, and wherein said step of verifying comprises the substep of decoding said encoded message data.

5. The method according to claim 4 further comprising the step of storing the encoded message data as the training check signal until reception of the confirmation signal.

6. The method according to claim 1 wherein said step of forming comprises the substep of encoding a portion of message data according to an encoding method, and wherein said step of verifying comprises the substep of decoding the encoded message data.

7. The method according to claim 6 wherein said step of transmitting the rest of the message data comprises the substep of encoding the rest of the message data according to the same encoding method as used for the portion of message data.

8. A method according to claim 1, wherein said predetermined portion of message data comprises a first predetermined number N of scan lines, each having a second predetermined number of data bits and wherein said step of verifying comprises the substep of determining whether the received training check signal corresponds to the second predetermined number of bits per scan line.

9. A method according to claim 2, wherein said predetermined portion of message data comprises a first predetermined number N of scan lines, each having a second predetermined number of data bits and wherein said step of verifying comprises the substep of determining whether the received training check signal corresponds to the second predetermined number of bits per scan line.

10. A method according to claim 3, wherein said predetermined portion of message data comprises a first predetermined number N of scan lines, each having a second predetermined number of data bits and wherein said step of verifying comprises the substep of determining whether the received training check signal corresponds to the second predetermined number of bits per scan line.

11. A method according to claim 4, wherein said predetermined portion of message data comprises a first predetermined number N of scan lines, each having a second predetermined number of data bits and wherein said step of verifying comprises the substep of determining whether the received training check signal corresponds to the second predetermined number of bits per scan line.

12. A method according to claim 5, wherein said predetermined portion of message data comprises a first predetermined number N of scan lines, each having a second predetermined number of data bits and wherein said step of verifying comprises the substep of determining whether the received training check signal corresponds to the second predetermined number of bits per scan line.

13. A method according to claim 6, wherein said predetermined portion of message data comprises a first predetermined number N of scan lines, each having a second predetermined number of data bits and wherein said step of verifying comprises the substep of determining whether the received training check signal corresponds to the second predetermined number of bits per scan line.

14. A method according to claim 7, wherein said predetermined portion of message data comprises a first predetermined number N of scan lines, each having a second predetermined number of data bits and wherein said step of verifying comprises the substep of determining whether the received training check signal corresponds to the second predetermined number of bits per scan line.

15. A facsimile transceiver comprising:
transceiver means for transmitting and receiving message data and procedural data; and
controlling means coupled to said transceiver means for controlling said transceiver means to transmit a predetermined portion of the message data to a facsimile receiver as a training check signal, said transceiver means being adapted to verify training when said transceiver means receives a training check signal from a facsimile transmitter, said transceiver means being further adapted to transmit procedural data representing success in training to a facsimile transmitter when training has succeeded, said transceiver means being further adapted to transmit the rest of said message data when said transceiver means receives procedural data representing success in training from said facsimile receiver.

16. An improved facsimile communication system having first transceiver means provided in a facsimile transmitter for transmitting message data and receiving procedural data and having second transceiver means provided in a facsimile receiver for receiving message data and transmitting procedural data, wherein the improvement comprises:
first control means coupled to said first transceiver means for controlling said first transceiver means to transmit a predetermined portion of said message data as a training check signal; and
said control means coupled to said second transceiver means for verifying training in said second transceiver means and controlling said second transceiver means to transmit procedural data representing success in training when training is successful wherein said first control means controls said first transceiver means to transmit the rest of said message data after said first transceiver means receives said procedural data representing success in training.

17. An improved facsimile communication system according to claim 16 wherein said second controlling means further controls said second transceiver means to transmit a control signal representing failure in training when training is unsuccessful, and said first control means further controls said first transceiver means to transmit said training check signal again when said first transceiver means receives said control signal.

18. An improved facsimile communication system according to claim 17 wherein said improvement further comprises memory means for storing predetermined portion of message data to be transmitted as training check signal until reception of data representing success in training.

19. An improved facsimile communication system according to claim 17 wherein said improvement further comprises encoder means for encoding the predetermined portion of message data in accordance with a predetermined encoding method before providing the data to said first transceiver means, and decoder means for decoding said encoded data received by said second transceiver means.

20. An improved facsimile communication system according to claim 19 wherein the data to be stored in said memory means is the encoded data.

21. An improved facsimile communication system according to claim 16 wherein said improvement further comprises encoder means for encoding the predetermined portion of message data to be transmitted as the training check signal in accordance with a predetermined encoding method and providing the encoded data signal to said first transceiver means, and decoder means for decoding the encoded data signal received by said second transceiver means.

22. An improved facsimile communication system according to claim 21 wherein said encoding means encodes the rest of the message data in accordance with the same encoding method as that used for the predetermined portion of the message data.

* * * * *